UNITED STATES PATENT OFFICE.

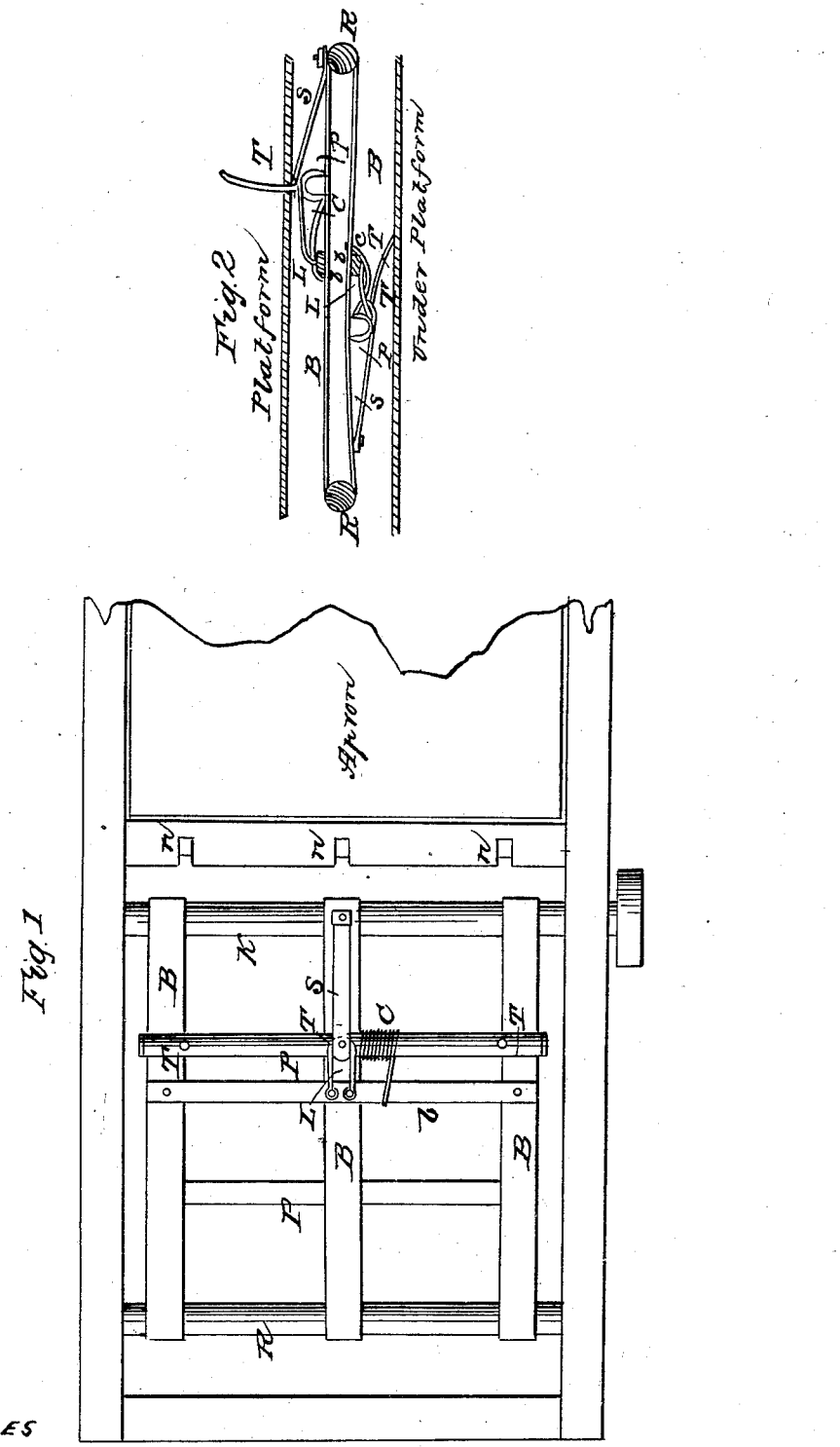

HIRAM CURTIS, OF NEW YORK, N. Y.

IMPROVEMENT IN RAKING ATTACHMENTS TO HARVESTERS.

Specification forming part of Letters Patent No. 44,709, dated October 18, 1864.

*To all whom it may concern:*

Be it known that I, HIRAM CURTIS, of the city of New York, in the county of New York, in the State of New York, have invented a new and useful Improvement in Rakes for Harvesters; and I do hereby declare that the following is a full, clear, and exact description of the same, reference being had to the accompanying drawings, making a part of this specification, in which—

Figure 1 is a plan, and Fig. 2 a section, thereof, letters of reference being used to designate the same parts in each figure.

In Fig. 1 the platform is removed to show the arrangement of the various parts. B B B are endless belts passing over the rollers R R', and carrying around the teeth T T T. S is an elastic spring attached at one end to the belt B, and having the other end attached to the tooth T. L is a wire loop, also passing around the tooth T, and either fastened to the belt or attached to a cross-bar, *b*. C is a coil of wire wound around the roller P, and having one end pass over the cross-bar *b*.

In Fig. 2 is shown a sectional view, in which the position of the teeth are shown both above and below the belt.

In operating the rake the teeth T T T remain upright on the upper side of the belts while passing from roller to roller, but upon passing around the roller R' they are drawn back to nearly a horizontal position by the loop L, the coil C allowing the roller P to turn part way around, and thus the teeth may pass around the roller R', and in the position assumed on the under side of the bands can pass to the roller R. The under platform prevents the teeth from projecting too low until they come to pass around the roller R, when they are relieved, and by the aid of the spring S again brought to an upright position.

The notches *n n n*, cut in the frame, are for the tip ends of the teeth to pass through. By placing the roller R' farther from the frame the necessity for these notches may be obviated.

By attaching the loop L directly to the middle band the cross-bar *b* and coil-spring C may be dispensed with, provided the strap S is of sufficient strength to do the work without them.

The strap S may be a coil-spring, or may be made of rubber or other elastic substance.

The cross-bar *b* may extend each way out to the frame, and thus act as a guide to keep the bands in place. The bands B B B may be endless chains, and by cog-wheel or other attachment a binder may be made to operate with the rake.

The advantages of this rake are its simplicity, compactness, and freedom from liability to get out of order.

Having thus described my improvement in rakes for harvesters, what I claim as my invention, and desire to secure by Letters Patent, is—

1. The elastic strap or spring S and loop L, when used for the purpose set forth.

2. In combination with the endless bands or chains B B B, rollers R R' and P, the elastic strap or spring S, loop L, coil-spring C, and cross-bar *b*, the whole operating substantially as set forth.

H. CURTIS.

Witnesses:
JOHN T. REEVES, Jr.,
E. P. CURTIS.